United States Patent
Hamid

(10) Patent No.: US 7,869,635 B2
(45) Date of Patent: *Jan. 11, 2011

(54) FINGERPRINT SCAR RECOGNITION METHOD AND APPARATUS

(75) Inventor: Laurence Hamid, Ottawa (CA)

(73) Assignee: Activcard Ireland Limited, Fremont, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/626,160

(22) Filed: Jan. 23, 2007

(65) Prior Publication Data

US 2007/0263911 A1 Nov. 15, 2007

Related U.S. Application Data

(63) Continuation of application No. 10/189,494, filed on Jul. 8, 2002, now Pat. No. 7,184,580.

(51) Int. Cl.
G06K 9/00 (2006.01)
B42D 15/00 (2006.01)
G06F 7/04 (2006.01)

(52) U.S. Cl. .................. 382/124; 283/69; 340/5.83

(58) Field of Classification Search ................ 382/124; 283/69; 340/5.86
See application file for complete search history.

(56) References Cited

U.S. PATENT DOCUMENTS

| | | | | |
|---|---|---|---|---|
| 4,325,570 A | * | 4/1982 | Estrada | 283/69 |
| 4,495,644 A | * | 1/1985 | Parks et al. | 382/123 |
| 4,525,859 A | * | 6/1985 | Bowles et al. | 382/125 |
| 4,817,183 A | | 3/1989 | Sparrow | |
| 4,876,725 A | | 10/1989 | Tomko | |
| 5,815,252 A | * | 9/1998 | Price-Francis | 356/71 |
| 5,987,155 A | | 11/1999 | Dunn et al. | 382/116 |
| 5,995,641 A | * | 11/1999 | Yamaguchi | 382/124 |
| 6,072,895 A | | 6/2000 | Bolle et al. | 382/125 |
| 6,373,968 B2 | | 4/2002 | Okano et al. | |
| 6,608,914 B1 | * | 8/2003 | Yamaguchi et al. | 382/118 |
| 6,766,040 B1 | | 7/2004 | Catalano et al. | 382/115 |
| 2002/0154793 A1 | | 10/2002 | Hillhouse et al. | |
| 2004/0052405 A1 | | 3/2004 | Walfridsson | 382/115 |

OTHER PUBLICATIONS

Funada et al., "Feature Extraction Method for Palmprint Considering Elimination of Creases," *Pattern Recognition, 14th Int'l Conf.*, Brisbane Australia, Aug. 16-20, 1998, 1849-1854.

(Continued)

*Primary Examiner*—Kathleen S Yuan
(74) *Attorney, Agent, or Firm*—Perkins Coie LLP

(57) ABSTRACT

A method of recognizing an injury pattern on a fingerprint is disclosed. The method comprises the steps of providing biometric information to a contact imager; imaging and characterizing the biometric information; comparing an image of the biometric information against previously stored templates; upon a comparison result of the comparison, determining an injury pattern; wherein upon an injury pattern determination, performing a comparison against a stored template based on features extracted from the biometric data and the damage data.

22 Claims, 15 Drawing Sheets

OTHER PUBLICATIONS

Gunawardena et al., "Coincident Sequencing for Fingerprint Verification," *Circuits and Systems, 33rd Midwest Symposium*, Calagary, Canada, Aug. 12-14, 1990, 845-848.

Lim et al., "Capacitive Fingerprint Sensor Chip for Automatic Matching," *TENCON*, 2000, 2, 442-446.

Vernon, "Automatic Detection of Secondary Creases in Fingerprints," *Optical Engineering, Soc. Of Photo-Optical Instrumentation Engineers*, Oct. 1, 1993, 32(10), 2616-2623.

Wahab et al., "Novel Approach to Automated Fingerprint Recognition," *IEEE Proceedings: Vision, Image and Signal Processing, Institution of Electrical Engineers*, Jun. 24, 1998, 145(3), 160-166.

Harvey, Mike. "Why veins could replace fingerprints and retinas as most secure form of ID." *Times Online* Nov. 11, 2008 <http://technology.timesonline.co.uk/tol/news/tech_and_web/articles5129384.ece>.

\* cited by examiner

FINGERPRINT SCAR RECOGNITION METHOD AND APPARATUS

CROSS REFERENCE TO RELATED APPLICATIONS

This application is a Continuation of U.S. patent application Ser. No. 10/189,494 filed Jul. 8, 2002, which claims benefit to U.S. Provisional Application No. 60/307,169 filed Jul. 24, 2001.

FIELD OF THE INVENTION

The invention relates to biometric identification and more particularly to a method and system for biometric identification of individuals based on identifiable damage to their biometric information source.

BACKGROUND OF THE INVENTION

Security, access control and privacy are important issues in many venues throughout modern society. Government, commercial and private entities continue to seek effective means to control access to either property or information by authorized individuals while excluding access by all others.

Mechanical devices, as simple as a keyed padlock or as robust as the combination lock on a bank vault, have long been used to secure property. Access is allowed to all who possess a matching "key" device or have "knowledge" of the correct combination. Electronic key cards (swipe cards, chip cards and the like) are little more than modern keys and suffer from the same fundamental limitations of all key based security systems: keys can be lost, stolen, and duplicated. Further, keys do not identify the individual possessing and/or using the key.

Modern knowledge based security systems require the correct entry of specific information, into a data entry device, in order to control access. These systems generally require knowledge of an access code that has been selected by a user or has been preset by the system during the user enrollment process. Password protection is commonly employed for computer network security, telephone banking, calling cards, telephone answering services, buildings, and safes. A very effective synergy between key based and knowledge based security systems is typified by the use of swipe cards in combination with passwords in order to provide access to automatic teller machines.

Knowledge based security systems suffer from the same fundamental limitations as combination lock systems: the information that must be provided to the data entry device must be simple; the required knowledge must be concise and easy to remember, and, just as with key systems, knowledge based security systems do not unambiguously identify the individual entering the information.

Complementing the proliferation of computers and computer networks into all aspects of business and daily life is the growing concern over controlled access to information stored in electronic databases.

Short strings of alphanumeric characters, typically less than ten in number, characterize most password protected systems. A word, phrase or number combination familiar to the user is often selected during the user enrollment process. Randomly assigned codes are often forgotten, as users have no reliable method of remembering them. Writing down the codes and storing them in close proximity to an access control device (is, the combination lock) results in a secure access control system with a very insecure code. Alternatively, the nuisance of a user making several attempts to enter variations of a complicated code, or lengthy string of characters, renders the access control system more of a problem than a solution.

A security access system that provides substantially secure access control, and is not based on either a key device or user knowledge, is a biometric identification system. A biometric identification system accepts biometric information from a user of the system and attempts to identify and control access by the user by matching the provided information against information belonging to registered users of the system. Biometric information is derived from an anatomic structure of an individual and, as such, is derived from the unique genetic content and the sum of the environmental influences on that individual. One such biometric identification system is a fingerprint recognition system

OBJECT OF THE INVENTION

It is an object of the present invention to provide a method of distinguishing scars from other possible factors that might alter an image of a fingerprint. The ability to distinguish scars as a modification of the fingerprint image allows for the scar information to be easily incorporated into the authentication protocol.

SUMMARY OF THE INVENTION

In accordance with the present invention, there is provided a method of recognizing damage to a biometric information source comprising the steps of: sensing biometric information from a biometric information source to provide sensed data; extracting features from the sensed data, the features indicative of identifiable content of the sensed data; analyzing the features to determine if some features, when grouped, are characteristic of damage to the biometric information source from which biometric information was sensed; and, when some of the features are characteristic of damage to the biometric information source, grouping data relating to the some features and to the indicated damage to form damage data.

According to another aspect of the invention there is provided a storage medium comprising data stored therein and relating to instructions for performing the steps of: sensing biometric information from a biometric information source to provide sensed data; extracting features from the sensed data, the features indicative of identifiable content of the sensed data; analyzing the features to determine if some features, when grouped, are characteristic of damage to the biometric information source from which biometric information was sensed; and, when some of the features are characteristic of damage to the biometric information source, grouping data relating to the some features and to the indicated damage to form damage data.

According to yet another aspect of the invention there is provided an apparatus comprising: a suitably programmed processor (111) for performing the steps of:

extracting features from the sensed data, the features indicative of identifiable content of the sensed data;

analyzing the features to determine if some features, when grouped, are characteristic of damage to the biometric information source from which biometric information was sensed (22; 32; 42; 48; 52; 58; 63; 802; 812); and, when some of the features are characteristic of damage to the biometric information source, grouping data relating to the some features and to the indicated damage to form damage data (22; 32; 42; 48; 52; 58; 64; 802; 812).

According to the invention there is provided a method of recognizing damage to a biometric information source comprising the steps of: providing biometric information to a contact imager to generate an electronic representation thereof; characterizing the electronic representation to identify features associated with an injury within the biometric information; when the features associated with an injury correspond to stored features associated with an injury, performing one of identifying and authorizing an individual.

BRIEF DESCRIPTION OF THE DRAWINGS

The invention will now be described with reference to the attached drawings in which.

DETAILED DESCRIPTION OF THE DRAWINGS

According to the invention temporary or permanent damage to a biometric information source is used as data for authorizing or identifying an individual. Thought the description below refers to fingerprint based biometric authentication systems is also applicable to other biometric identification systems.

Figure 1:
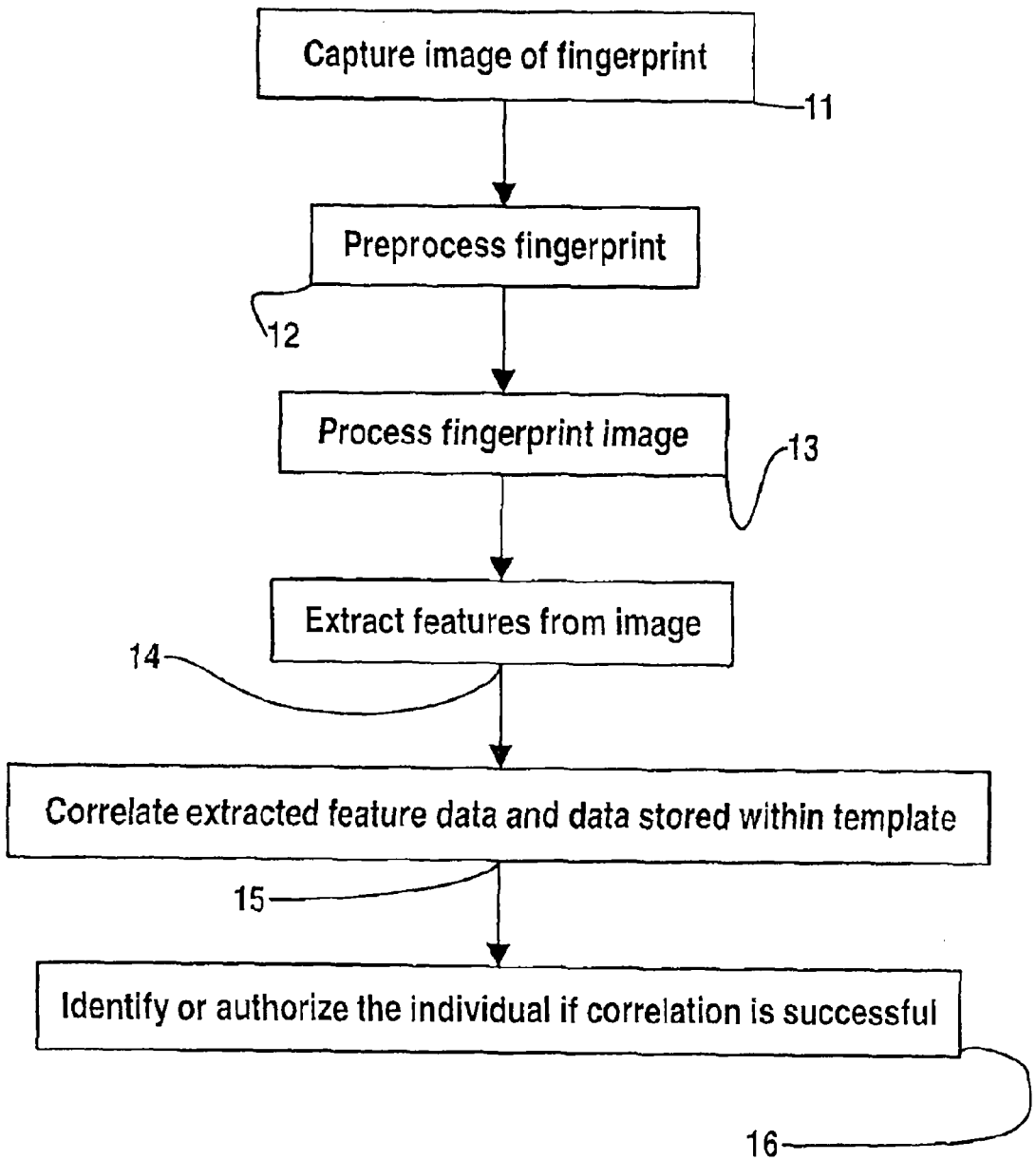
FIG. 1 is a prior art simplified flow diagram of a method of identifying an individual based on their fingerprint.

Referring now to FIG. 1, a simplified flow diagram of a prior art method of fingerprint identification is shown. A fingerprint is imaged using a contact sensor at 11. The fingerprint image is then preprocessed at 12. Preprocessing typically begins with adjusting the image for contrast. Preprocessing also includes a step of filtering the image to eliminate noise including image features that are likely caused by the imaging process or conditions and are unlikely to be in the biometric information itself. Of course, in the filtering step image information is typically lost but, since a same filtering process is applied during template generation, the features remaining are sufficient for recognition.

Once preprocessing of the image is completed, processing of the image is performed at 13. In processing, the image is reoriented to result in a common reference frame. For example, the core of the fingerprint is identified and analysed. The core location and orientation are then used to ensure that the fingerprint image is realigned such that the core location and orientation are a predetermined core location and orientation. Of course, once the core location and orientation are known, a transform is created to reorient the image. Alternatively, the transform is only applied to extracted feature data obviating a need to realign the image data. Once the image is within a known frame of reference, feature extraction is performed at 14 to determine for each of a plurality of features data for use in registering the fingerprint image against template data. Thus, for example, feature locations, orientations, and feature types are extracted for a predetermined number of features.

Once the feature data is determined, it is correlated with data within the template at 15 to determine a likelihood of a match. Depending on the determined likelihood, the individual providing the biometric information source to the imager is either identified, authorized, or neither at 16. As is evident to those of skill in the art, image processing is the step during which the most variation in a quality of the biometric identification process is achievable. Thus, the step of processing is adjusted to try to enhance the process by reducing false acceptance and false rejection.

Alternatively, feature data is extracted within a known reference frame relative to a known feature such that it need not be transformed itself. For example, each feature location is identified by an angle relative to the core direction and an offset from the core location.

Figure 2A:
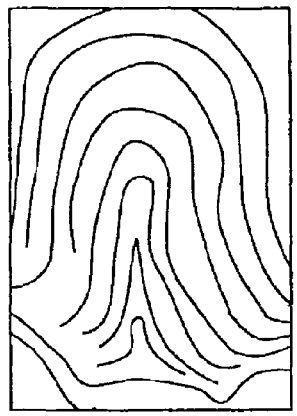
FIG. 2a is a schematic diagram of an imaged fingerprint area.

Referring now to FIG. 2a, a representation of a portion of fingerprint image is provided or a healthy fingertip having no damage thereto. As is evident, there is a plurality of features including minutia where bifurcation occurs within a ridge or where a ridge ends abruptly.

Figure 2B:
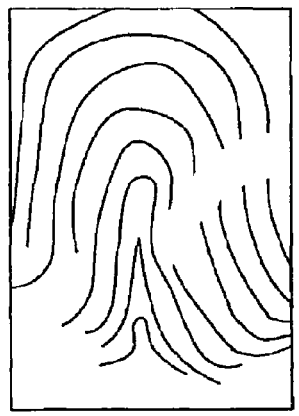
FIG. 2b is a representation of the fingerprint area of FIG. 1 having an injury.
Figure 2C:
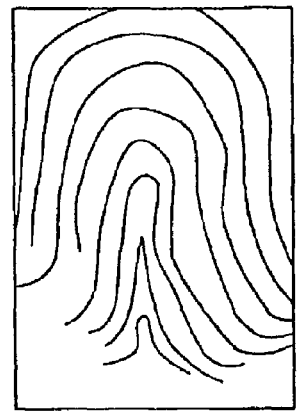
FIG. 2c is a representation of the fingerprint area of FIG. 2b wherein the injury is artificially healed.

Fingers often show injuries. Typically, these injuries heal and disappear completely. Sometimes, however, when an injury is of a certain type, for example a very deep cut, scarring occurs. Macroscopically, a most probable shape of such a scar resulting from a cut is a line substantially straight across a fingertip in some arbitrary direction. In FIG. 2b, a representation of the fingerprint of FIG. 2a and having a cut therein is shown. In FIG. 2c, a representation of the fingerprint of FIG. 2a and having a scar resulting from the cut of FIG. 2b is shown. At the level of the fingerprint, consistent interruption of the natural lines is observable. This kind of injury shows a regular pattern and, of course, once the skin has scarred the scar is always present on subsequent images of the fingertip.

The regularity of a typical cut injury on a fingertip and the dimensions of the wound allow a processor characterizing the imaged fingerprint to recognize the wound pattern and identify same as a wound. Whereas prior art fingerprint recognition systems eliminate the features resulting from the cut shown in FIG. 2b, in order to allow recognition, this involves discarding valuable identification related information and reconstruct the missing part of the fingerprint image.

Figure 3A:
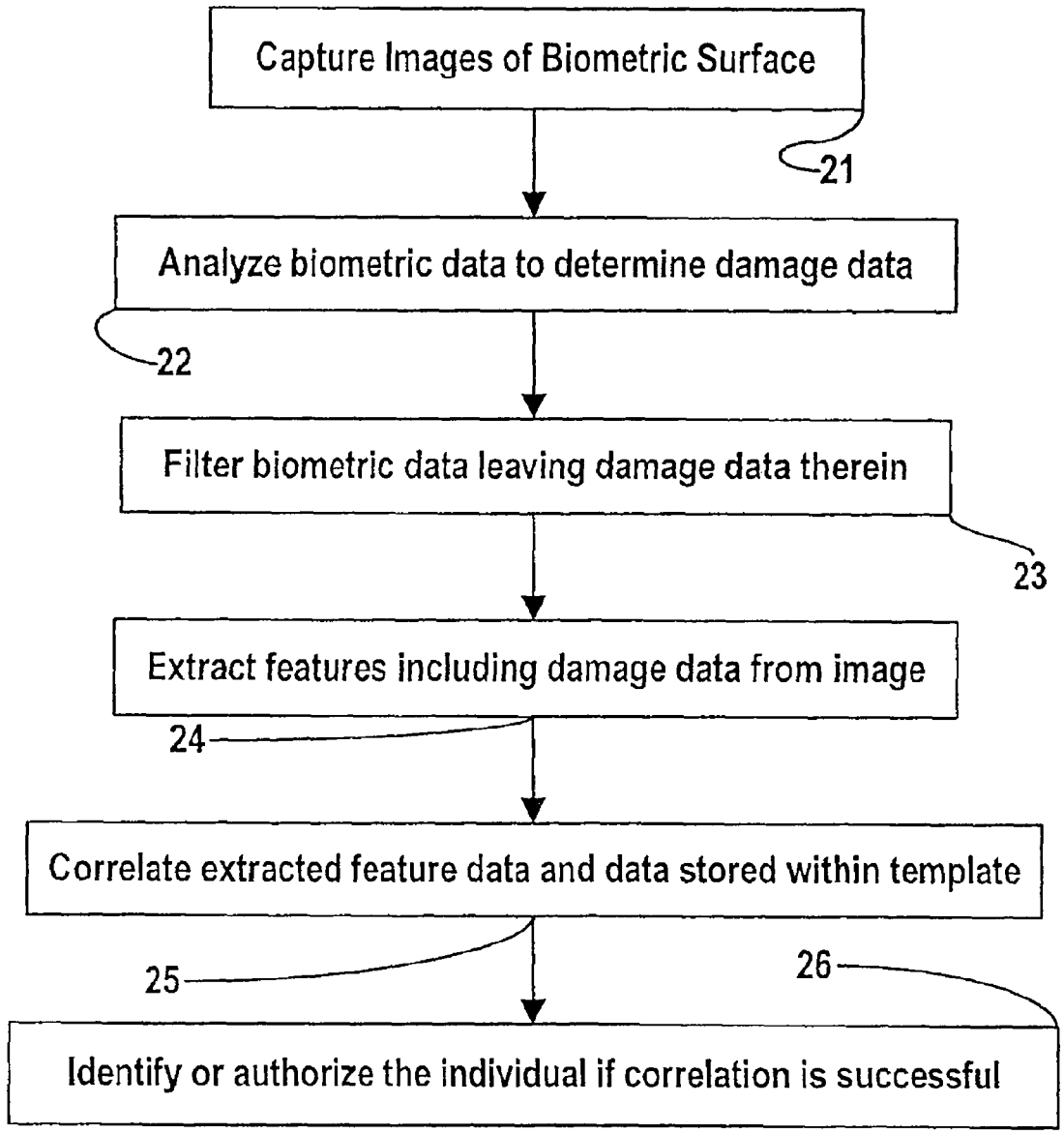
FIGS. 3a and 3b are simplified flow diagrams of two embodiments of methods of identifying damage to a biometric information source in analysis thereof in order to preserve the additional information is shown.

Referring to FIG. 3a, a simplified flow diagram of a method of identifying damage to a biometric information source in analysis thereof in order to preserve the additional information is shown. A biometric information source is sensed at 21 to provide biometric data. The biometric data is then analysed to extract damage data at 22 relating to damage to the biometric information source. The biometric data is then adjusted and filtered leaving the damage data therein at 23. The biometric information is then analysed to extract features therefrom including the damage data at 24 for use in registration of the biometric data against template data previously stored within memory at 25. In dependence upon the registration result, the individual is one of identified, authorized, and neither identified nor authorized at 26.

Figure 3B:
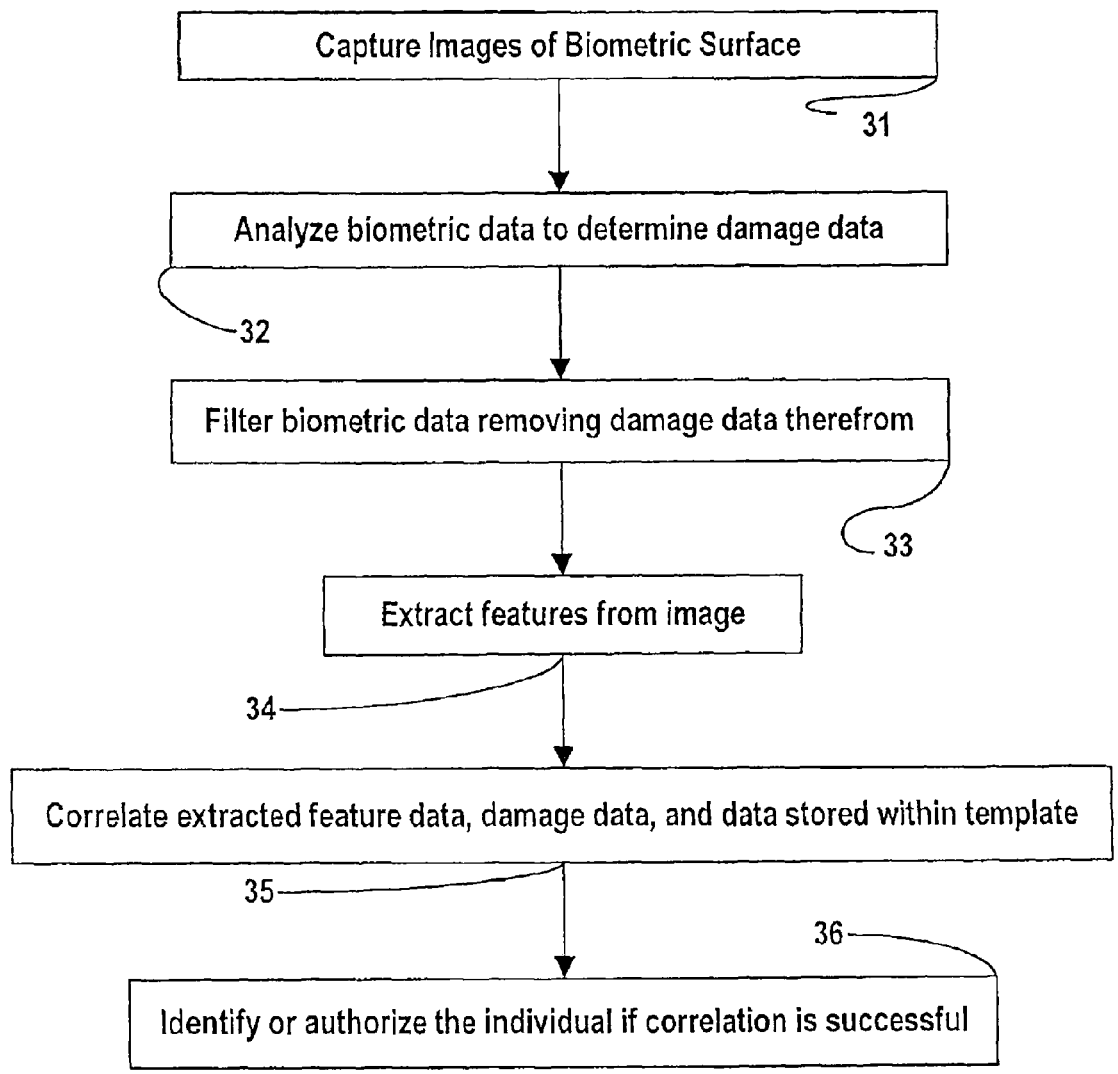

Referring to FIG. 3b, a simplified flow diagram of a method of identifying damage to a biometric information source in analysis thereof in order to preserve the additional information is shown. A biometric information source is sensed at 31 to provide biometric data. The biometric data is then analysed to extract damage data at 32 relating to damage to the biometric information source. The biometric data is then adjusted and filtered to remove noise artifacts and to remove the damage data therein at 33. The biometric information is then analysed to extract features therefrom at 34, which, along with the damage data, are for use in registration of the biometric data against template data previously stored within memory at 35. In dependence upon the registration result, the individual is one of identified, authorized, and neither identified nor authorized at 36.

By identifying the damage data separately from the remaining feature data, the registration process performed against the template data can account for the damage data both in terms of features absent from the extracted feature data and in terms of updating the template should damage data be determined to be scar data.

Figure 4A:
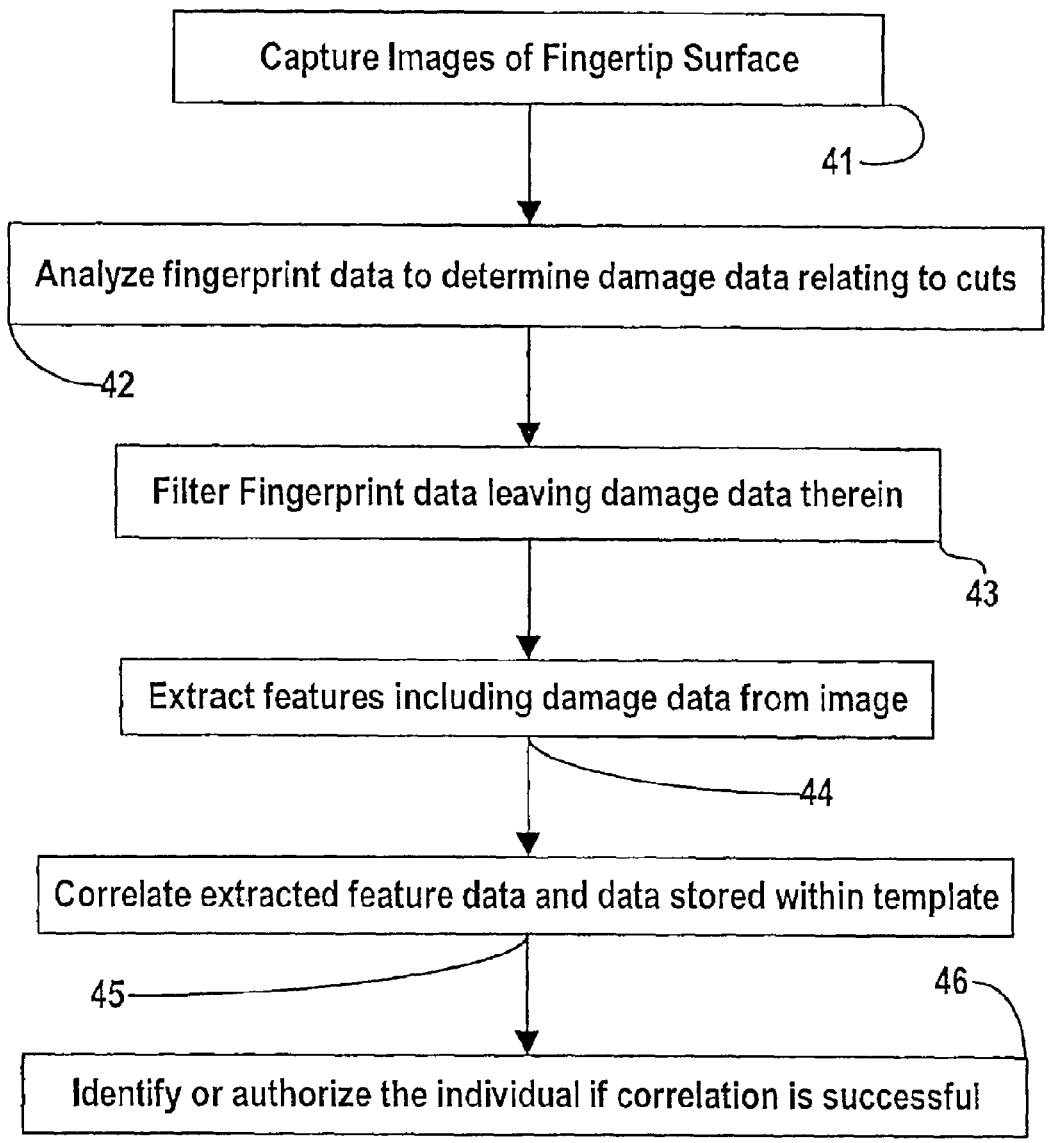
FIGS. 4a and 4b are simplified flow diagrams of two embodiments of methods of processing fingerprint data to extract damage data relating to cuts.
Figure 4B:
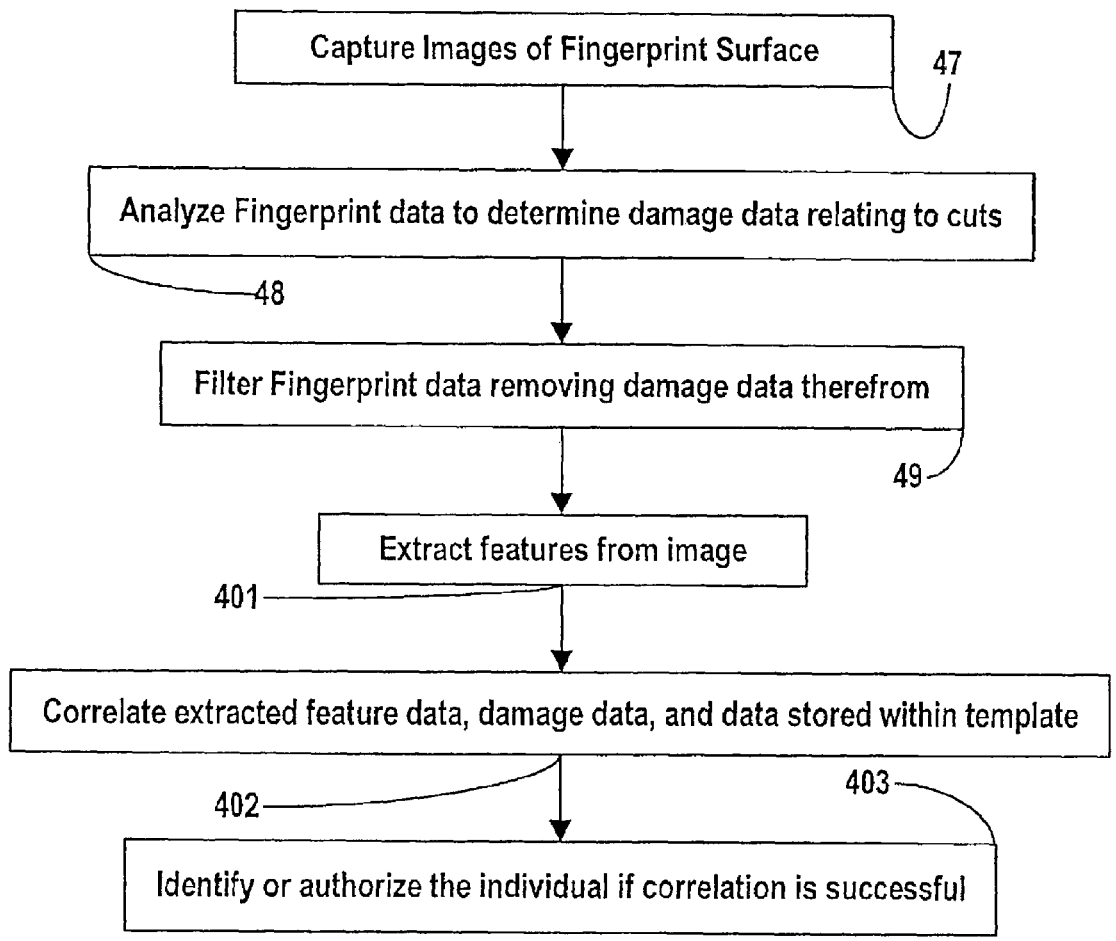

Referring to FIGS. 4a and 4b, flow diagrams similar to those of FIGS. 3a and 3b are shown but specific to fingerprint registration. Referring to FIG. 4a, a fingertip is imaged to provide biometric data at 41. The biometric data is then analysed to extract damage data relating to damage to the fingertip at 42. The damage data is in the form of lines across the fingerprint image in any direction that are other than ridges. These lines are determined and are extracted in the form of a position, length and direction. Alternatively, they are identified as a plurality of minutia each indicative of a ridge ending and each lying along the line of the fingertip damage. The biometric data is then adjusted and filtered leaving the damage data therein at 43. The biometric information is then analysed to extract features therefrom including the damage data at 44 for use in registration of the biometric data against template data previously stored within memory. Data relating to each feature is determined within a known frame of reference and are provided for use in registration. The data is registered against stored template data at 45 to determine registration results. In dependence upon the registration result, the individual is one of identified, authorized, and neither identified nor authorized at 46.

Referring to FIG. 4b, a fingertip is imaged to provide biometric data at 47. The biometric data is then analysed to extract damage data relating to damage to the fingertip at 48. The damage data is in the form of lines across the fingerprint image in any direction that are other than ridges. These lines are determined and are extracted in the form of a position, length and direction. Alternatively, they are identified as a plurality of minutia each indicative of a ridge ending and each lying along the line of the fingertip damage. The biometric data is then adjusted and filtered to remove noise artifacts and to remove the damage data therein at 49. The biometric information is then analysed to extract features therefrom at 401. Data relating to each feature is determined within a known frame of reference and are provided for use in registration. The data is registered against stored template data at 402 to determine registration results along with the damage data. In dependence upon the registration result, the individual is one of identified, authorized, and neither identified nor authorized at 403.

In the methods of FIGS. 4a and 4b, the damage data is indicative of a cut or approximately linear scar. Thus, as shown in FIGS. 2b and 2c, the damage data relates to a pattern formed within the fingerprint indicating a line therein of ridge endings that are unlikely to occur naturally. This line, once identified, is likely indicative of damage to the fingertip.

Figure 2D:
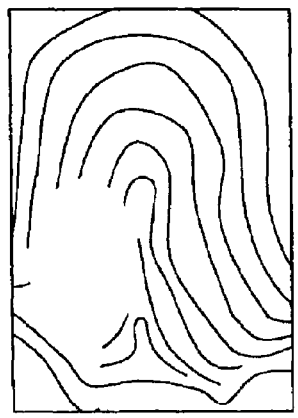
FIG. 2d is a representation of the fingerprint area of FIG. 1 having a burn injury.
Figure 2E:
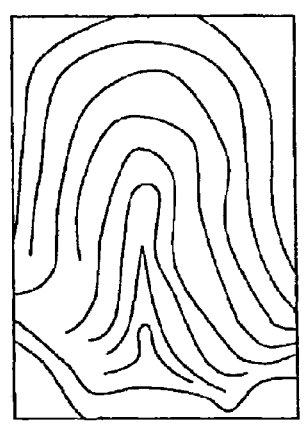
FIG. 2e is a representation of the fingerprint area of FIG. 2d wherein the injury is artificially healed.

Of course, fingertips also may suffer burns or other damage. In FIG. 2d, a representation of the fingerprint of FIG. 2a and having a burn thereon is shown. In FIG. 2e, a representation of the fingerprint of FIG. 2a and having a scar resulting from the burn of FIG. 2d is shown.

Figure 5A:
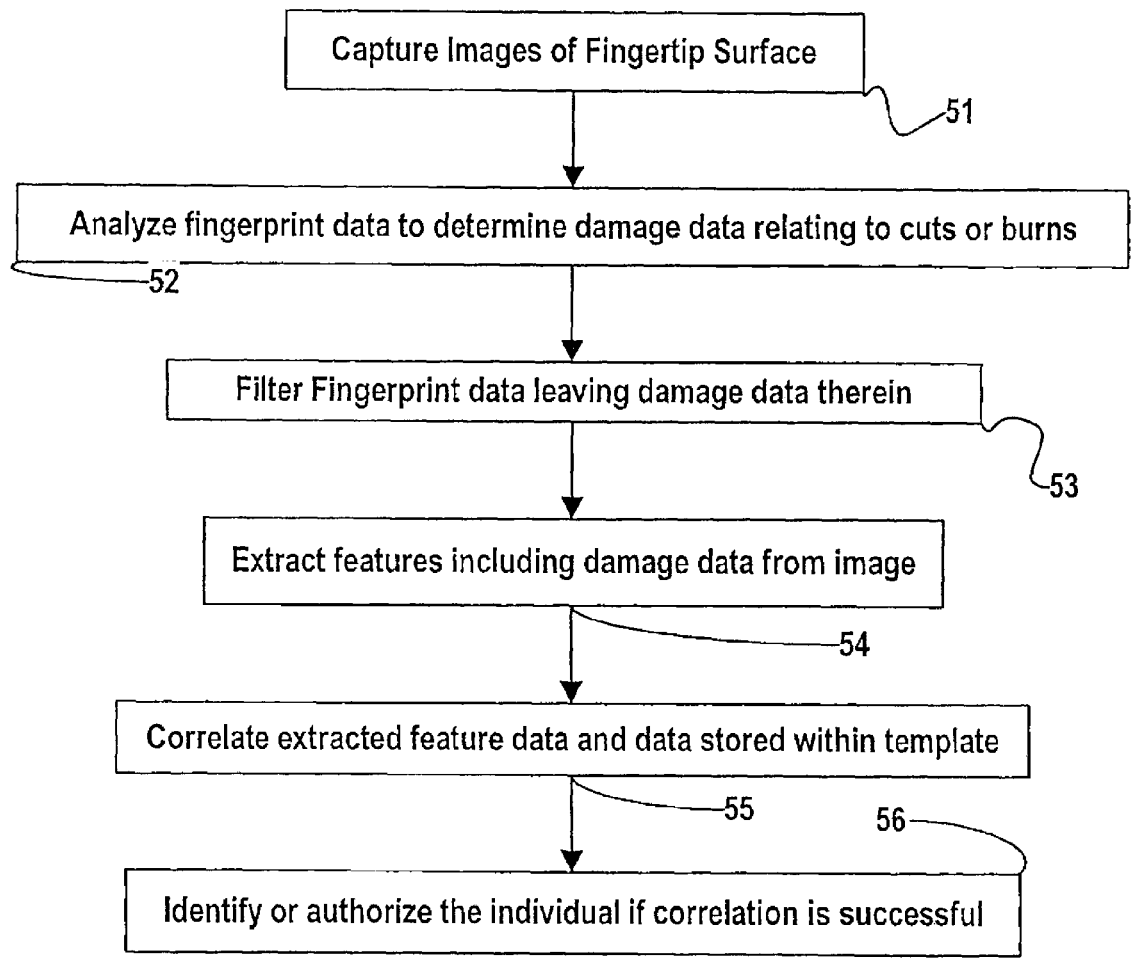
FIGS. 5a and 5b are simplified flow diagrams of two embodiments of methods of processing fingerprint data to extract damage data relating to cuts and/or burns.

Referring to FIG. 5a, a similar method to that of FIG. 4a wherein the damage includes cuts and burns is shown. A fingertip is imaged to provide biometric data at 51. The biometric data is then analysed to extract damage data relating to damage to the fingertip at 52. The damage data is in the form of one of a line across the fingerprint image in any direction that is other than ridges and an area within the fingerprint image absent ridge and trough patterns but surrounded by ridge and trough patterns on all peripheral edges thereof. The line is determined and extracted in the form of a position, length and direction. Alternatively, it is identified as a plurality of minutia each indicative of a ridge ending and each lying along the line of the fingertip damage. The area within the fingerprint image is either identified as a plurality of minutia about the area or as an area definition. In either case, the resulting data is sufficient to uniquely identify the damage from the damage data. The biometric data is then adjusted and filtered leaving the damage data therein at 53. The biometric information is then analysed to extract features therefrom including the damage data at 54 for use in registration of the biometric data against template data previously stored within memory. Data relating to each feature is determined within a known frame of reference and are provided for use in registration. The data is registered against stored template data at 55 to determine registration results. In dependence upon the registration result, the individual is one of identified, authorized, and neither identified nor authorized at 56.

Figure 5B:
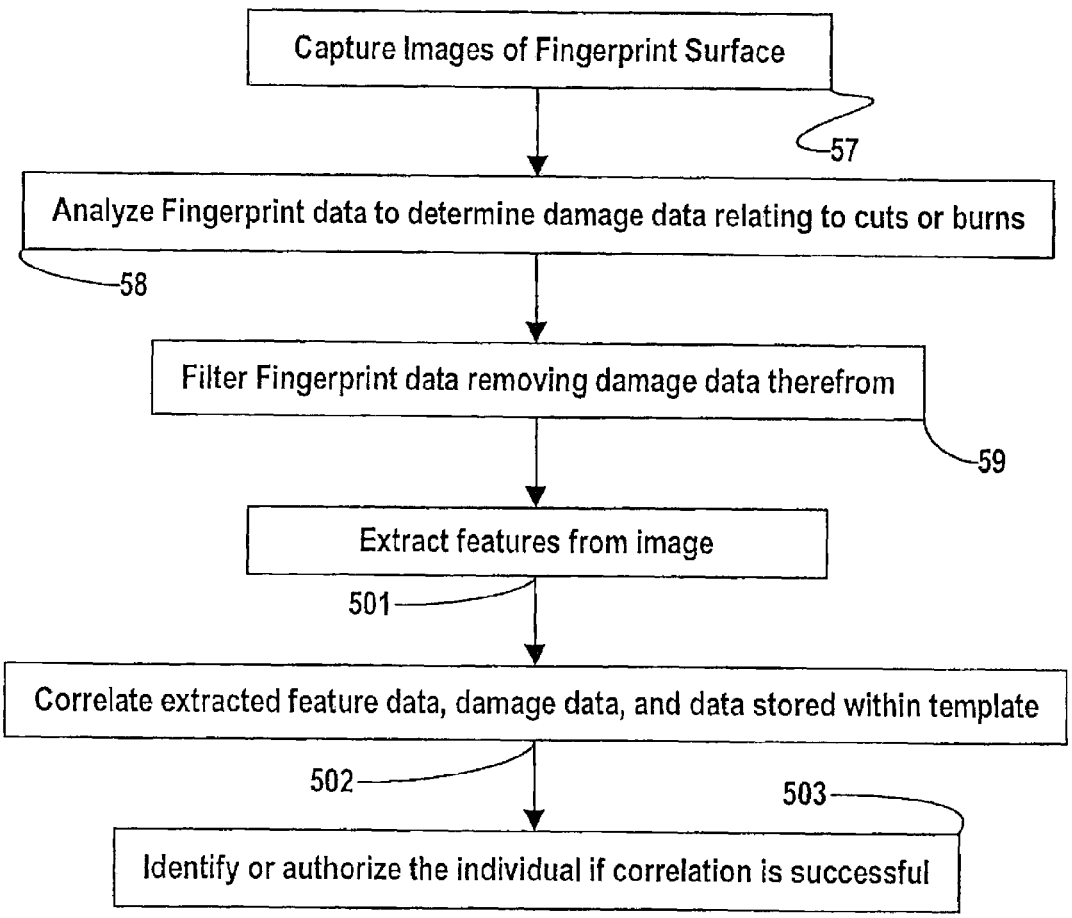

Referring to FIG. 5b, a fingertip is imaged to provide biometric data at 57. The biometric data is then analysed to extract damage data relating to damage to the fingertip at 58. The damage data is in the form of one of a line across the fingerprint image in any direction that is other than ridges and an area within the fingerprint image absent ridge and trough patterns but surrounded by ridge and trough patterns on all peripheral edges thereof. The line is determined and extracted in the form of a position, length and direction. Alternatively, it is identified as a plurality of minutia each indicative of a ridge ending and each lying along the line of the fingertip damage. The area within the fingerprint image is either identified as a plurality of minutia about the area or as an area definition. In either case, the resulting data is sufficient to uniquely identify the damage from the damage data. The biometric data is then adjusted and filtered to remove noise artifacts and to remove the damage data therein at 59. The biometric information is then analysed to extract features therefrom at 501. Data relating to each feature is determined within a known frame of reference and are provided for use in registration. The data is registered against stored template data at 502 to determine registration results along with the damage data. In dependence upon the registration result, the individual is one of identified, authorized, and neither identified nor authorized at 503.

Once scar tissue is permanently present on the fingerprint, prior art filtering operations ignore valuable identification data from the image. Advantageously, a method according to the invention supports dynamic recognition of an injury pattern in order to dynamically update a template.

Figure 6:
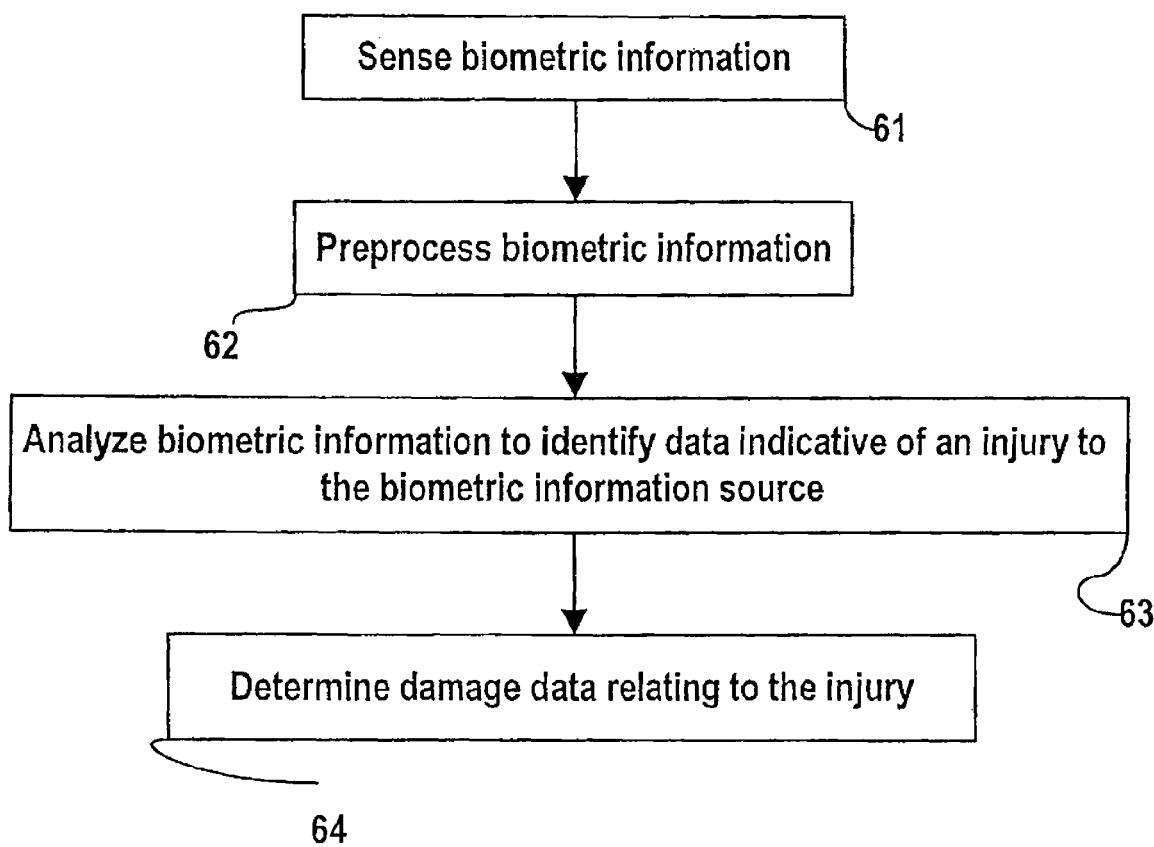
FIG. 6 is a simplified flow diagram of a method of damage data extraction.

Referring to FIG. 6, a simplified flow diagram of a method of identifying and extracting damage data is shown. The method is explained with reference to a fingerprint though it may be applied to other biometric data. A fingerprint is provided to a processor for processing thereof at 61. Contrast within the fingerprint image is adjusted to highlight ridge and trough patterns therein and to make feature extraction more easily performed at 62. The fingerprint is then examined to identify an injury pattern in the form of a pattern of features that is indicative of an injury at 63. For example, two rows of minutia facing each other and each representative of a ridge termination and following two approximately consistently spaced apart lines is indicative of a cut or a scar resulting form a cut. An area having little or no contrast therein and surrounded by a plurality of minutia each indicative of a ridge ending and forming a closed boundary abut the area is indicative of tissue damage within the fingerprint. Of course, this latter pattern may also be indicative of dirt, plaster, glue and so forth deposited on the fingertip and therefore preventing accurate imaging of an area thereof.

When an injury pattern is identified, the processor determines damage data relating thereto at 64. For example, for a cut, a line length, direction, location and type are determined. The line type includes data relating to jaggedness and/or a straightness of the line.

In the event the dimensions and pattern of the wound are such that a substantial portion of the fingerprint image is disrupted, a recognition process may lack the required sophistication or may have insufficient data with which to identify or authenticate the individual. Thus, the invention preferably requires the damage data to be evaluated in conjunction with other biometric data to identify an individual. When other biometric data is insufficient for authentication and identification purposes, authentication of the individual must proceed by different means. Alternatively, authorization or identification proceeds merely based on the damage data.

Figure 7:
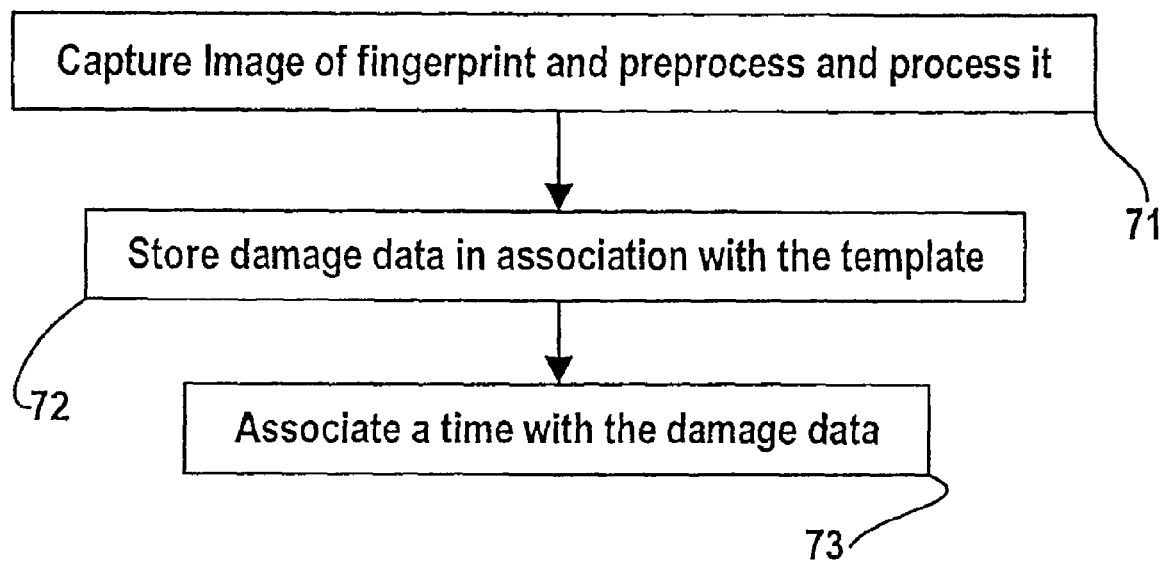
FIG. 7 is a simplified flow diagram of a method of automatically updating template data in response to detected damage data.

Referring to FIG. 7, a method of automatically updating a template in dependence upon damage data is presented. Though specific parameters are presented therein, it is evident to those of skill in the art that experimentation and testing will allow selection of parameters on a case-by-case basis. If a wound lasts for a long period of time, more than ten days for example, the registration process must each time ignore the wound data in identifying the individual. After several years, for example, ignoring the wound data is still performed. This is problematic since the wound data has now become part of the individual's biometric information source. As such, the method shown in FIG. 7 allows for automated updating of a template to accommodate permanent and semi-permanent changes to biometric information sources.

A fingerprint is captured, preprocessed, and processed in accordance with any of the preceding inventive methods at 71. The damage data is stored within the template or in association therewith at 72. At 73 associated with the damage data is time data indicative of the time when the damaged biometric information source was sensed. On a subsequent access attempt, the registration process confirms a consistency between the damage data and the newly acquired biometric data. For example, if a cut is determined to exist within the five previous sensed fingerprints over the past hour, a sixth fingerprint absent a cut detected therein is highly suspect. Further, after six (6) months, if the cut remains within the fingerprint, the template is adjusted to add the cut as a scar being a permanent feature within the fingerprint. Thus, damage data stored within a template or associated therewith is either indicative of a temporary damage or permanent damage. Further, some damage data is indicative of potential damage. A potential burn, if it disappears a few hours later was likely just dirt or something stuck to the fingertip sensed. If it remains for a very long time, then is determined to be a scar and the template is automatically updated.

Figure 8A:
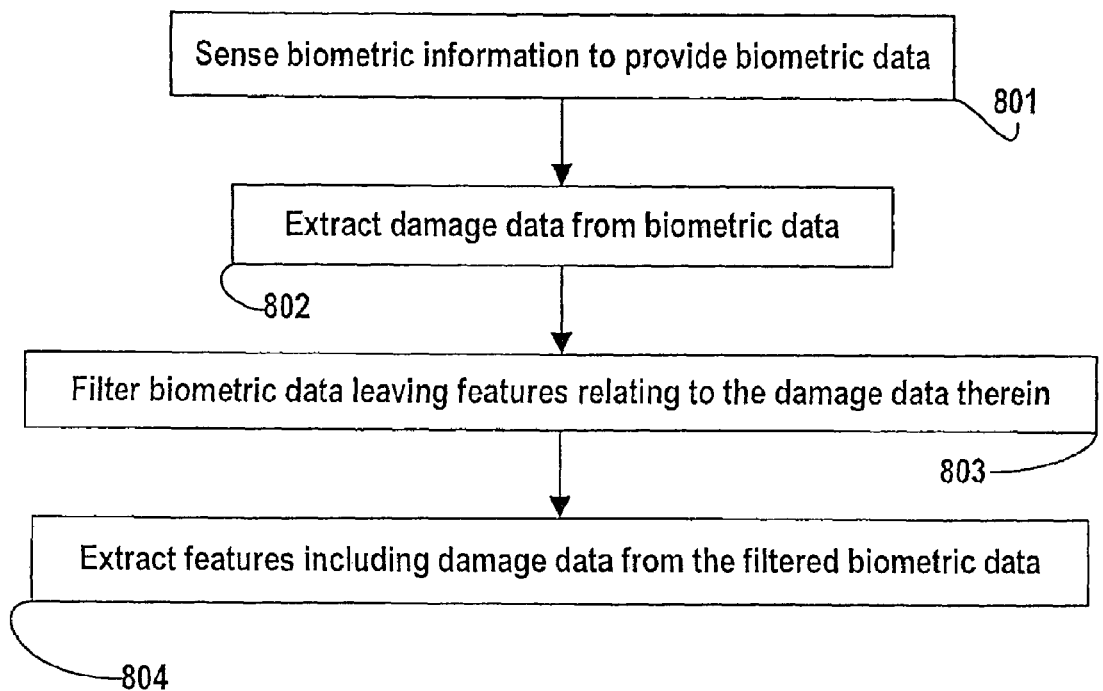
FIGS. 8a and 8b are simplified flow diagrams of two embodiments of methods of enrolling individuals to form biometric templates that account for permanent injury to the biometric information source and the templates including damage data when detected.
Figure 8B:
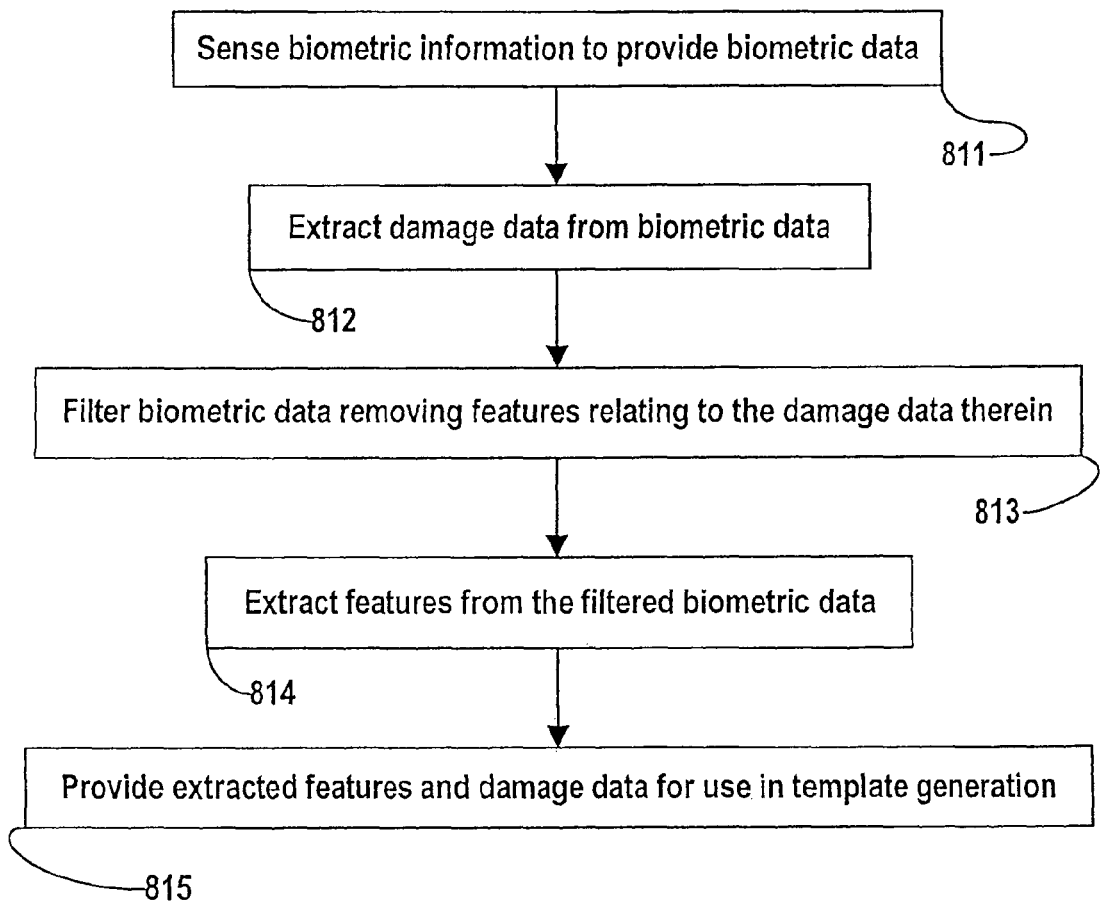

Referring to FIGS. 8*a* and 8*b*, a damage sensitive template generation process for use during enrollment is shown in simplified flow diagram. Though the process is described with reference to fingerprints and linear cuts detected therein, it is applicable to other forms of damage as well. Referring to FIG. 8*a*, biometric information in the form of a fingertip is sensed by imaging same to provide biometric data at 801. The biometric data is then analysed to extract damage data relating to damage to the fingertip at 802. The damage data is in the form of lines across the fingerprint image in any direction that are other than ridges. These lines are determined and are extracted in the form of a position, length and direction. Alternatively, they are identified as a plurality of minutia each indicative of a ridge ending and each lying along the line of the fingertip damage. The biometric data is then adjusted and filtered leaving the damage data therein at 803. The biometric information is then analysed to extract features therefrom including the damage data at 804 for use in generating a template thereof.

In such a case, the features of the fingerprint include the features about the scar and, as such, no data relating to the scar damage is necessary in the registration process so long as the scar features are included within the feature data.

Referring to FIG. 8*b*, a fingertip is imaged to provide biometric data at 811. The biometric data is then analysed to extract damage data relating to damage to the fingertip at 812. The damage data is in the form of lines across the fingerprint image in any direction that are other than ridges. These lines are determined and are extracted in the form of a position, length and direction. Alternatively, they are identified as a plurality of minutia each indicative of a ridge ending and each lying along the line of the fingertip damage. The biometric data is then adjusted and filtered to remove noise artifacts and to remove the damage data therein at 813. The biometric information is then analysed to extract features therefrom at 814. Data relating to each feature is determined within a known frame of reference and are provided along with the extracted damage data for use in generating a template thereof at 815.

Alternatively, instead of automatically updating template data as described with reference to FIG. 7, users are prompted to re-enroll with the system in order to regenerate a new template when damage data is detected to have become scar data. Using the template generation technique described with reference to FIG. 7, allows for a damage sensitive template generation process during the re-enrollment in order to most accurately characterize the biometric data during the enrollment process.

Since injuries are typically medium term modifications of biometric information, it is also possible in accordance with the invention to modify the user template in accordance with injuries to indicate that the injury is there. Changes to the injury are then restricted to those that may occur within the timeframe between image capture steps. For example, a cut on a user's fingertip today cannot completely vanish by tomorrow. Therefore, the appearance and disappearance of injuries is a valuable marker in identifying individuals. Of course, once the injury is no longer detected, information relating thereto is removed from the template.

Figure 9:
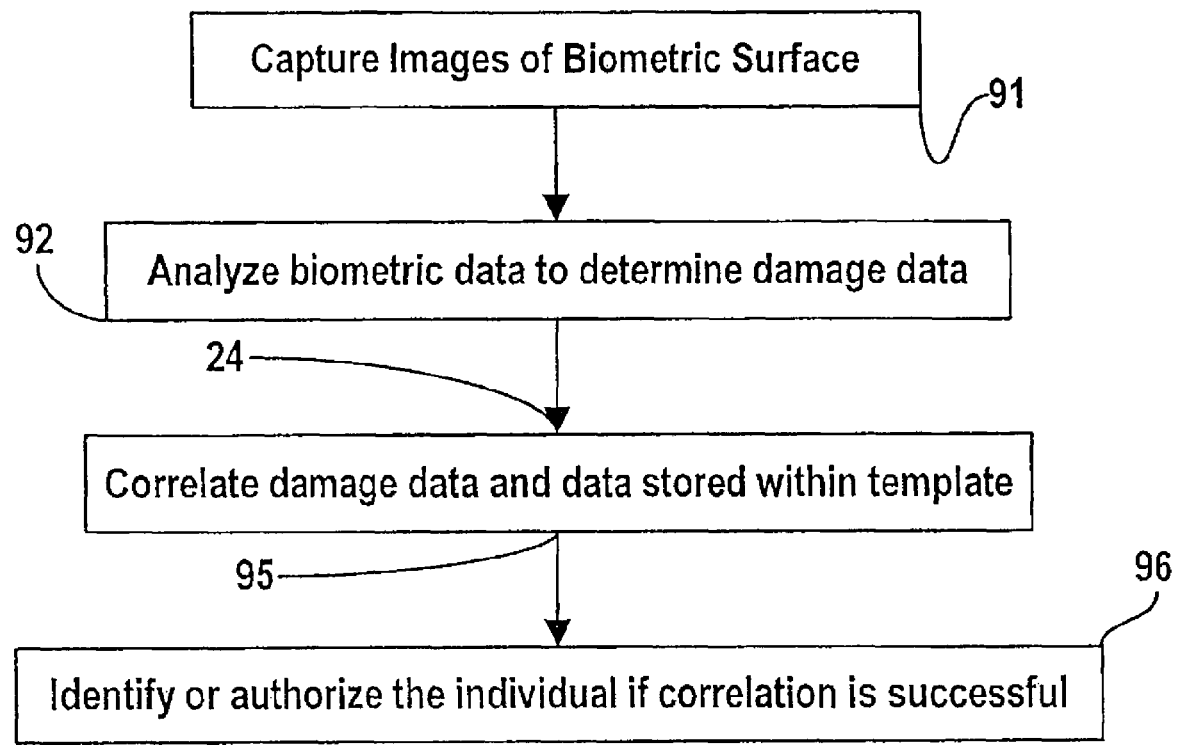
FIG. 9 is a simplified flow diagram of a method of authorizing and/or identifying an individual based on a presence of damage data extracted from their biometric information.

Referring to FIG. 9, a flow diagram of a method of identifying or authorizing an individual based on damage data present within their biometric information is shown. A biometric information source is sensed at 91 to provide biometric data. The biometric data is then analysed to extract damage data at 92 relating to damage to the biometric information source. The damage data is for use in registration of the biometric data against template data including template damage data previously stored within memory at 95. In dependence upon the registration result, the individual is one of identified, authorized, and neither identified nor authorized at 96.

Figure 10:
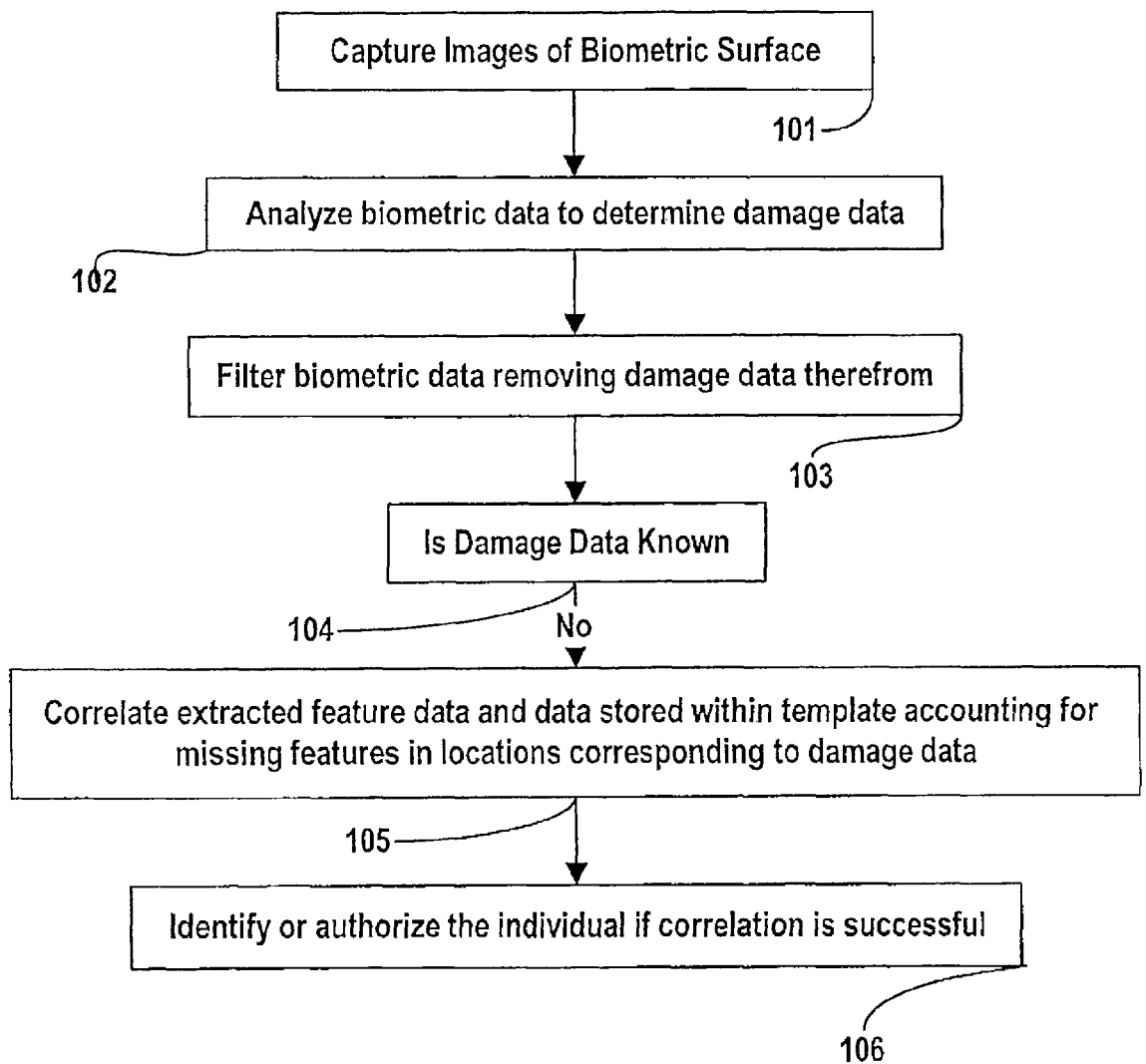
FIG. 10 is a simplified flow diagram of a method of authorizing and/or identifying an individual based feature data other than feature data in locations corresponding to a presence of damage data extracted from their biometric information; and, FIG. 11 is a simplified block diagram of an apparatus according to the invention.

Referring to FIG. 10, a flow diagram of a method of identifying or authorizing an individual based on damage data present within their biometric information is shown. A biometric information source is sensed at 101 to provide biometric data. The biometric data is then analysed to extract damage data at 102 relating to damage to the biometric information source. The biometric data is then filtered to extract the damage data therefrom at 103. The template is analysed to determine whether or not damage data was stored therein at 104. If damage data is not known, then the features extracted from the sensed data are registered against features within the template accounting for the location of the damage data at 105. As such, features in locations corresponding to where the damage data is determined are ignored in feature registration because those features are not likely present within the sensed data. In dependence upon the registration result, the individual is one of identified, authorized, and neither identified nor authorized at 106.

Figure 11:
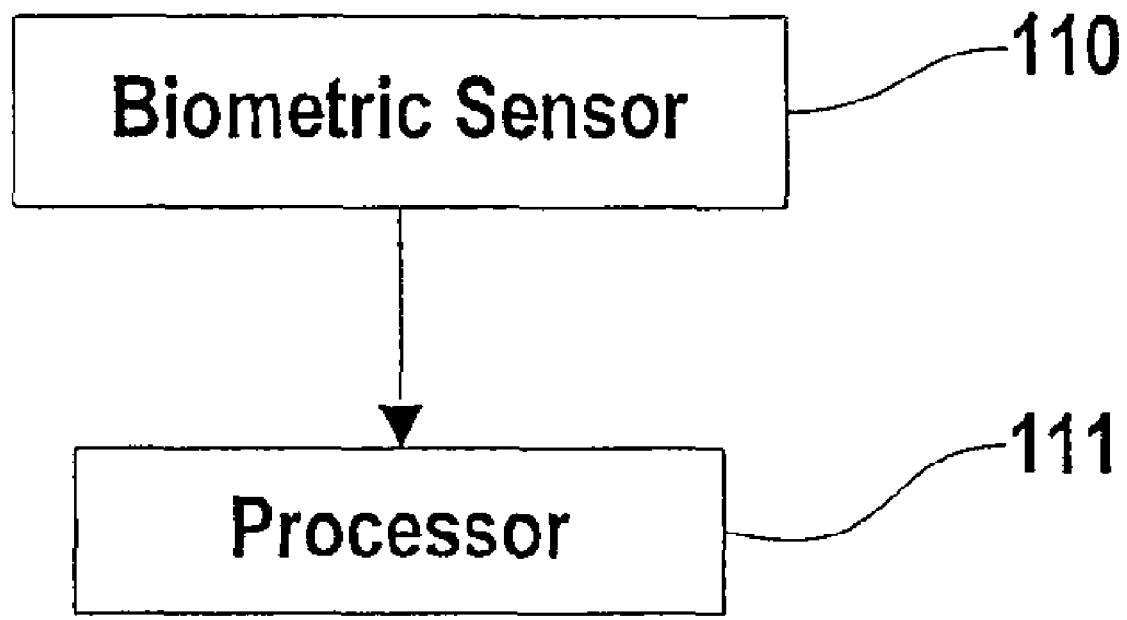

Referring to FIG. 11, an apparatus is shown. The apparatus includes a sensor for sensing biometric information 110 and a processor 111. The processor is suitably programmed for performing one or more of the above described methods.

The damage data is for use in improving registration of the biometric data against template data at 105. In dependence upon the registration result, the individual is one of identified, authorized, and neither identified nor authorized at 106.

Alternatively, damage data includes damage data relating to a plurality of different causes of damage such as, for example, lacerations and abrasions with irregular patterns, substantial loss of tissue, blisters, holes, insect bites, bites in general, swelling, frost bite, substantial bruising, etc.

Numerous other embodiments may be envisaged without departing from the spirit or scope of the invention.

What is claimed:

1. A method of recognizing damage to a biometric information source, the method comprising:
   receiving biometric information sensed with a contact imager;
   characterizing the biometric information with a processor to identify biometric data and damage data, wherein the damage data is associated with at least one of a type, a size, and a location of an injury to the biometric information source;
   comparing the biometric data with stored authorization data without comparing the damage data to the stored authorization data; and
   when the biometric data corresponds to at least a portion of the stored authorization data, generating updated stored authorization data comprising the stored authorization data and the damage data for subsequent authentication of the biometric information source based on a comparison with the updated stored authorization data.

2. The method of claim 1 wherein the biometric information comprises a fingerprint.

3. The method of claim 2 wherein the injury comprises at least one of a cut and a scar resulting from a cut, and wherein the damage data is associated with at least one of a length of the cut, a location of the cut, and an orientation of the cut.

4. The method of claim 3 wherein biometric information comprises an image and the damage data comprises a plurality of features along two approximately equally spaced lines within the image.

5. The method of claim 2 wherein the injury comprises at least one of a burn and a scar resulting from a burn, and wherein the damage data is associated with at least one of a shape of the burn and a location of the burn.

6. The method of claim 5 wherein the damage data comprises a plurality of features forming a boundary about a region without identifiable features or patterns therein.

7. The method of claim 2, further comprising storing the damage data within a template.

8. The method of claim 1, further comprising determining if the injury to the biometric source is permanent, and wherein generating the updated stored authorization data comprises generating the stored authorization data only when the injury to the biometric source is permanent.

9. A non-transitory computer readable storage medium storing computer executable instructions which, when executed by a processing device of the computer, configure the processing device to perform a method for recognizing damage to a biometric information source, the method comprising:
   characterizing biometric information sensed with a contact imager to identify biometric data and damage data, wherein the damage data is associated with at least one of a type, a size, and a location of an injury to the biometric information source;
   comparing the biometric data and damage data with stored authorization data without comparing the damage data to the stored authorization data; and
   when the biometric data corresponds to at least a portion of the stored authorization data, generating updated stored authorization data comprising the stored authorization data and the damage data for subsequent authentication of the biometric information source based on a comparison with the updated stored authorization data.

10. The computer readable medium of claim 9 wherein the biometric information comprises a fingerprint.

11. The computer readable medium of claim 10 wherein the injury comprises at least one of a cut and a scar resulting from a cut, and wherein the damage data is associated with at least one of a length of the cut, a location of the cut, and an orientation of the cut.

12. The computer readable medium of claim 11 wherein the biometric information comprises an image and the damage data comprises a plurality of features along two approximately equally spaced lines within the image.

13. The computer readable medium of claim 10 wherein the injury comprises at least one of a burn and a scar resulting from a burn, and wherein the damage data is associated with at least one of a shape of the burn and a location of the burn.

14. The computer readable medium of claim 13 wherein the biometric information comprises an image and the damage data comprises a plurality of features forming a boundary about a region without identifiable features or patterns therein.

15. The computer readable medium of claim 9 wherein the method further comprises storing the damage data within a template.

16. The computer readable storage medium of claim 9 wherein the method performed by the processing device further comprises determining if the injury to the biometric source is permanent, and wherein generating the updated stored authorization data comprises generating the updated stored authorization data only when the injury to the biometric source is permanent.

17. An apparatus comprising a processing device and a computer readable storage medium storing instructions which, when executed by the processing device, configure the processing device to perform a method for recognizing damage to a biometric information source, the method comprising:
- characterizing biometric information sensed with a contact imager to identify biometric data and damage data, wherein the damage data relates to at least one of a type, a size, and a location of an injury to the biometric information source;
- comparing the biometric data with stored authorization data without comparing the damage data to the stored authorization data; and
- when the biometric data corresponds to at least a portion of the stored authorization data, generating updated stored authorization data comprising the stored authorization data and the damage data .

18. The apparatus of claim 17 wherein the processing device is a first processing device, and further comprising a communication circuit for communicating with a second processing device, wherein the communication circuit receives a template including the stored authorization data from the second processing device.

19. The apparatus of claim 17 wherein the method performed by the apparatus further comprises storing time data associated with a time when the biometric information was sensed.

20. The apparatus of claim 19, further comprising determining if the injury to the biometric information is permanent, wherein determining if the injury is permanent comprises:
- determining if the damage data matches previously sensed damage data; and
- determining if a predetermined amount of time has elapsed between the time data and the previously sensed damage data.

21. The apparatus of claim 20 wherein the predetermined amount of time is at least six months.

22. The apparatus of claim 17 wherein the method performed by the apparatus further comprises determining if the injury to the biometric source is permanent, and wherein generating the updated stored authorization data comprises generating the updated stored authorization data only when the injury to the biometric source is permanent.

* * * * *

UNITED STATES PATENT AND TRADEMARK OFFICE
CERTIFICATE OF CORRECTION

| | | |
|---|---|---|
| PATENT NO. | : 7,869,635 B2 | Page 1 of 1 |
| APPLICATION NO. | : 11/626160 | |
| DATED | : January 11, 2011 | |
| INVENTOR(S) | : Hamid | |

It is certified that error appears in the above-identified patent and that said Letters Patent is hereby corrected as shown below:

On the Title page, item (56), under "Other Publications", in Column 2, Line 1, delete "Palmpront" and insert -- Palmprint --.

Page 2, item (56), under "Other Publications", in Column 1, Line 2, delete "Calagary," and insert -- Calgary, --.

Column 11, line 28, in Claim 17, delete "data ." and insert -- data. --.

Signed and Sealed this
Twenty-fourth Day of May, 2011

David J. Kappos
*Director of the United States Patent and Trademark Office*